United States Patent [19]

Buckholz, Jr. et al.

[11] Patent Number: 4,999,207

[45] Date of Patent: Mar. 12, 1991

[54] USE OF SCLAREOLIDE IN AUGMENTING OR ENHANCING THE ORGANOLEPTIC PROPERTIES OF FOODSTUFFS

[75] Inventors: Lawrence Buckholz, Jr., Middletown; Mohamad I. Farbood, Holmdel, both of N.J.; Nicolas Kossiakoff, Chambourcy, France; Lewis G. Scharpf, Fair Haven, N.J.

[73] Assignee: International Flavors & Fragrances Inc., New York, N.Y.

[21] Appl. No.: 474,410

[22] Filed: Jan. 2, 1990

Related U.S. Application Data

[63] Continuation of Ser. No. 418,171, Sep. 29, 1989, Pat. No. 4,917,913.

[51] Int. Cl.$^5$ .......................... A23L 1/22; A23L 1/236
[52] U.S. Cl. ...................................... 426/536; 426/548
[58] Field of Search ................................ 426/536, 548

[56] References Cited

U.S. PATENT DOCUMENTS 4,872,917 10/1989 Howe et al. .................. 131/275

*Primary Examiner*—Joseph Golian
*Attorney, Agent, or Firm*—Arthur L. Liberman

[57] ABSTRACT

Described is the use of sclareolide in augmenting or enhancing the organoleptic properties of foodstuffs whereby:

(i) richness and creaminess is added to low fat ice cream by admixing therewith the sclareolide;

(ii) the sweetness of foodstuffs and beverages sweetened with non-neutrative sweeteners, e.g., aspartame is enhanced by admixing with the non-neutrative sweetener, prior to addition to the beverage or foodstuff, sclareolide; and (iii) bitter nuances imnparted by the use of potassium chloride in salt substitutes are substantially covered by means of admixing salt substitutes with sclareolide.

1 Claim, No Drawings

USE OF SCLAREOLIDE IN AUGMENTING OR ENHANCING THE ORGANOLEPTIC PROPERTIES OF FOODSTUFFS

This is a continuation of application Ser. No. 418,171, filed 09/29/89, now U.S. Pat. No. 4,917,913.

BACKGROUND OF THE INVENTION

1. Field of the Invention

The present invention relates to foodstuffs having improved taste quality, more particularly, after taste quality. The present invention also relates to the use of sclareolide having the structure:

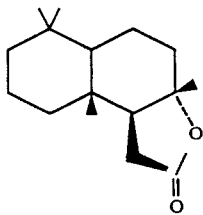

in enhancing the effect of sodium chloride or in debittering potassium chloride used as a substitute for a sodium chloride in such foods as soups. The present invention also relates to the enhancement of food flavors using sclareolide having the structure:

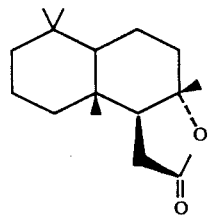

as a flavor enhancer.

The present invention also relates to the use of sclareolide having the structure:

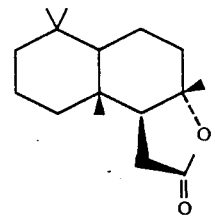

as at least a partial fat replacer to be used in dairy products such as ice cream, sour cream and whipped toppings. The present invention also relates to the use of sclareolide having the structure:

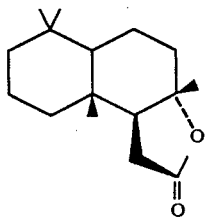

as a modulator to reduce or eliminate the aftertaste of artificial sweeteners such as aspartame.

2. Description of the Prior Art and Discussion of the Background

Taste qualities of foodstuffs change depending on the composition of taste components contained therein. When foodstuffs have miscellaneous tastes or an unpleasant taste, various improvements can be made by adjusting the composition. Among low calorie sweeteners, the use of which has been rapidly growing recently, for example, aspartame is characterized as a sweetener free from a bitter or astringent taste or an irritating taste and having a refreshing sweetness. However, aspartame is somewhat insufficient in rich tasteness in terms of sweet quality. Further, aspartame has a tendency to impart a sweet aftertaste, as is characteristically noted with sweeteners having a high titer. To improve such a sweet quality of aspartame, various proposals have been made (Published Unexamined Japanese Patent Application Nos. 90667/77, 148255/81, 63068/82, 141760/83, etc.).

However, the purpose of improving sweet quality of aspartame and imparting satisfaction comparable to that of sugar have not been sufficiently achieved. Further the method of using these various taste components in combination requires the component used in combination in a weight almost the same as or larger than that of aspartame, in most cases. From an aspect of rendering a low calorie or general purpose use, a further improvement has been desired.

In addition, tastes such as an astringent taste of the like, especially a different flavor or miscellaneous flavors left on the tongue as an aftertaste tend to adversely affect the taste quality of foodstuffs as a whole. In such a case, even though a beforetaste, etc., is of good quality, the taste quality tends to be lowered as a whole due to the unpleasant aftertaste and it becomes necessary to improve the whole taste from the beforetaste to aftertaste.

It is well known that the combination of monosodium L-glutamate (MSG) and a flavor inducing 5'-nucleotide, such as disodium inosine-5'-monophosphate (IMP), disodium guanosine-5'-monophosphate(GMP), or a mixture thereof, exhibit a synergistic flavoring activity. Moreover, mixtures comprising MSG and a flavor inducing 5'-nucleotide having long been widely used as economical flavoring agents or seasoning agents for various foods and beverages.

U.S. Pat. No. 4,258,072 issued on Mar. 24, 1981 discloses a mixed seasoning comprising 100 parts by weight monosodium glutamate; 0.05 to 25 parts by weight of a flavor inducing 5'-nucleotide; 5.0 to 38.0 parts by weight of sodium chloride; 0.1 to 0.87 parts by weight succinic acid and/or sodium succinate; and 0.5 to 10.0 parts by weight of at least one alkali metal salt of an organic acid which may be sodium fumarate, sodium citrate, sodium or calcium lactate, sodium maleate, sodium tartrate, sodium ascorbate or sodium aspartate.

U.S. Pat. No. 4,216,244 issued on Aug. 5, 1980 discloses a low sodium seasoning which includes potassium chloride as its major ingredient together with other nonsodium compounds masking the bitterness of the potassium chloride so that the seasoning can be substituted for sodium chloride seasonings.

U.S. Pat. No. 4,216,244 specifically discloses a low sodium salt seasoning consisting by weight of a mixture of about 90 percent low sodium salt base and about 10 percent low sodium diluent, with the base consisting by weight of a mixture of about 92 percent potassium chloride, about 3 percent L-glutamic acid and about 1 percent each of monopotassium glutamate, potassium citrate and potassium phosphate.

U.S. Pat. No. 4,066,793 issued on Jan. 3, 1978 discloses seasoning compositions, and processes for their production, which have an improved and enhanced meat-like flavor, and comprise mixtures containing extracts of yeast autolysates, 5'-nucleotides, sodium chloride and potassium salts; the potassium ion concentration being more than 0.5 times the sodium ion concentration.

Yamada in German Offenlegungsschrift No. 3144-166, French Patent No. 2,493,681 and Japan Published Application No. J57-079860 discloses a seasoning composition which may be either:

|      | Weight Percent |                      |
|------|----------------|----------------------|
| (i)  | 15-21          | magnesium chloride;  |
|      | 3-10           | magnesium sulfate;   |
|      | 2-4            | potassium chloride;  |
|      | 0.2-0.5        | magnesium bromide; and |
|      | 2-7            | sodium chloride; or  |
| (ii) | 15-21          | magnesium chloride;  |
|      | 6-9            | magnesium sulfate;   |
|      | 2-4            | potassium chloride;  |
|      | 0.2-0.4        | magnesium bromide;   |
|      | 2.6            | sodium chloride; and |
|      | 0.1-21         | calcium salt.        |

The Yamada patents and patent applications indicate that when the salt composition is diluted, it does not give bitterness but gives a round taste and gives rise to intensity of the saltiness of common salt.

Issued Japanese Patent No. J82-022311 discloses a synergistic seasoning composition containing monosodium glutamate, a nucleic acid type tasting compound, sodium chloride, succinic acid salt and at least one othr sodium salt. The seasoning is composed of:

(i) monosodium glutamate;

(ii) nucleic acid-type tasting substance such as disodium inosine-5'-monophosphate and/or disodium guanosine-5'-monophosphate;

(iii) sodium chloride;

(iv) succinic acid and/or sodium succinate; and (v) at least one salt selected from the group consisting of monosodium fumarate, trisodium citrate, monosodium lactate, calcium lactate, disodium malate, disodium tartarate, sodium ascorbate and monosodium aspartate.

The abstract of Japanese Patent No. J8/2022311 is as follows:

Derwent Abstracts ("FOODOC"/January, 1983) "Synergistic seasoning compsn.-contains monosodium glutamate, nucleic acid type tasting cpd., sodium chloride succinic acid salt and at least one other sodium salt. The seasoning is composed of (1) monosodium glutamate, (2) nucleic acid-type tasting substance (e.g., disodium inosine-5'-monophosphate and/or disodium guanoisine-5'-monophosphate), (3) sodium chloride, (4) succinic acid and/or sodium succinate and (5) at least 1 salt selected from monosodium fumarate, trisodium citrate, monosodium lactate, calcium lactate, disodium malate, disodium tartarate, sodium ascorbate and monosodium aspartate. The ratio (1):(2)=1:0.0005–0.25, esp. 1:0.001–0.15; (1)+(2):(3)=1:0.05–3, esp. 0.07–0.25 (1)+(2):(4)=1:0.0010–0.0070, esp. 1:0.0015:0.0055. (1)+(2):(5)=1:0.005–0.080, esp 1:0.010–0.070 (4) and (5) are expressed as the free acid. "By combining sodium chloride (4) and (5) the tasting strength of the seasoning can be increased and its taste made similar to that of monosodium glutamate."

U.S. Pat. No. 3,821,368 issued on June 28, 1974 discloses a therapeutic composition of an aqueous medium containing about 75–150 moles sodium ions; 5–50 moles potassium ion; 5–50 moles bicarbonate ions; 75–150 moles chloride ion and preferably containing about 1–30 moles magnesium ion and about 1–30 moles of $HPO_4=$ and/or $SO_4=$ ion with a solution having a pH of about 5.95–8.4 and an osmolality of about 170–460.

Japanese Patent No. J82/00777 issued on Jan. 7, 1982 and abstracted at Chem.Abstracts, Volume 96:161168h discloses a salt composition for sea food preservation containing 0.15–1% sodium chloride and a mixture of magnesium sulfate and calcium sulfate (1:1) weight ratio. It is indicated the magnesium sulfate and calcium sulfate marketedly improved the flavor of the food product.

U.S. Pat. No. 4,332,823 discloses a process for preparing a fabricated meat comprising the sequential steps of:

(a) emulsifying meat or meat by-products;

(b) admixing a salt, with the emulsified meat or meat by-products, in a weight-persent proportion of 1.5–3% based on the weight of the fabricated product, the salt being present in a proportion sufficient to extract salt soluble protein from the emulsified meat or meat by-products, the salt being selected from the group consisting of sodium chloride, potassium chloride, sodium phosphate, potassium phosphate, sodium polyphosphates and potassium polyphosphates;

(c) extracting the salt soluble protein from the meat and meat by-products;

(d) admixing texturized soy with the emulsified meat or meat by-products, extracted protein and salt;

(e) forming the mixture into a desired shape;

(f) blanching the shaped mixture in a temperature range of 170°–210° F.; and (g) thereafter maintaining the moisture content of the fabricated meat and meat by-product in the range of up to about 70%, the weight-percent proportions of the ingredients being:
meat and meat by-products: 77–92% and
texturized soy: 8–20%.

U.S. Pat. No. 4,340,614 issued on July 20, 1982 discloses a stringently sodium-restricted dietetic salt in its preparation which consists of a mixture of from 60–85 weight percent potassium chloride; 10–30 weight percent potassium adipate; 2–5 weight percent potassium tartrate; 0.5–2 weight percent potassium glutamate; 0.5–2 weight percent adipic acid; and from 0.004 up to 0.06 weight percent of potassium inosinate and/or potassium guanylate.

Furthermore, the use of certain materials for enhancing the flavor of foodstuffs is well recognized in the art. One of the first materials widely utilized for this purpose was monosodium glutamate. More recently, 5'-nucleotides, particularly inosinates and guanylates, have been similarly utilized as flavor enhancers. These nucleotides have particularly been used with meat and fish materials.

It has been recognized that certain pyrazines are present in coffee and other beverages. The use of acetylpyrazines to impart popcorn-like flavors has been suggested. The use of tetramethylpyrazine, preferably with vanillin, to improve the flavor of cocoa and chocolate material is also known. In these instances the pyrazines are said to have actively imparted a particular flavor character or specific aroma note to a foodstuff or other product.

Nothing in the prior art discloses that sclareolide having the structure:

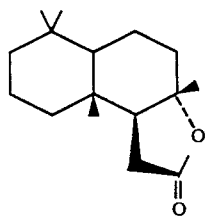

is useful as a fat replacer in ice cream whereby the mouthfeel affect caused by fat may be created using sclareolide as opposed to the fact in the ice cream.

Nothing in the prior art discloses that sclareolide having the structure:

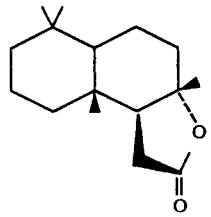

has a salt sparing effect whereby traces of sclareolide enhance traces of sodium chloride and also reduce the bittering affect of sodium chloride substitutes such as potassium chloride.

Nothing in the prior art discloses the use of sclareolide having the structure:

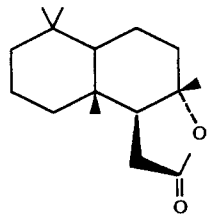

for accentuation or enhancement of flavor such as cheese flavors in snack applications particularly where the snacks are relatively low in fat content.

Nothing in the prior art discloses the use of sclareolide having the structure:

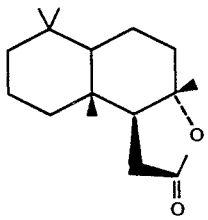

as an aspartame modulator particularly where the aspartame aftertaste is reduced or eliminated.

Fernandez, et al (PhytoChemistry, Volume 24, No. 1, pp. 188–189, 1985, (abstracted at Chemical Abstracts, Vol. 102:128829u) discloses the occurrence of sclareolide having the structure:

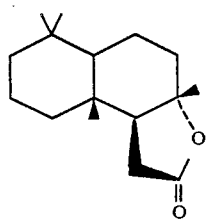

in *Sideritis nutans*.

Kaneko in Agr.Biol.Chem., Volume 35, No. 9, pages 1461–1462, 1971 (The Aroma of Cigar Tobacco, Part II/Isolation of Norambreinolide from Cigar Tobacco) (abstracted at Chemical Abstracts Volume 76, 1972, 56811b) discloses the isolation of sclareolide having the structure:

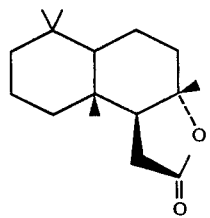

from cigar tobacco.

Wahlberg, et al, Acta Chemica Scandinavica B 33 (1979) pages 541–543 (title: "Tobacco Chemistry.49. *New Labdanic Diterpenoids Isolated from Tobacco", (abstract at Chemical Abstracts, Volume 92:19004a) discloses the occurrence of sclareolide having the structure:

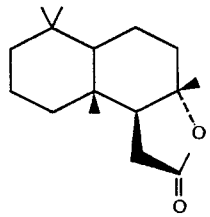

in tobacco.

Teresa, et al, An. Quim. 1979, 75(5), 335–40 (abstracted at Chemical Abstracts Volume 91:137149d)

discloses the isolation of sclareolide having the structure:

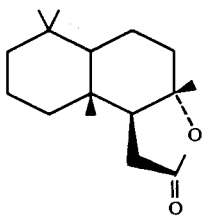

from the neutral part of the *C. ladaniferus* gum.

THE INVENTION

A. Sweetener And Astringent Quality Modulation

The taste of foodstuff especially a sweet aftertaste, an astringent aftertaste and other unpleasant aftertaste can be improved by means of the addition of sclareolide having the structure:

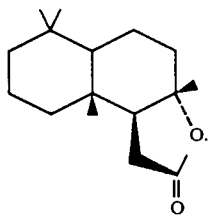

In the case of aspartame a sweet taste left on the tongue as an aftertaste imparts to those people experienced with the sweetness of sugar a reduced preferance but in the copresence of the sclareolide the aftertaste is cut and a taste quality more similar to sugar can be obtained. Further, in the case of tea, its aftertaste and astringent taste are restrained and a refreshing taste can be obtained.

In any case, a pleasant rich taste of foodstuffs is not compromised and the flavor of sclareolide is essentially nonexistent. That is, aftertaste of foodstuffs are improved and a refreshing taste quality free from a so-called luscious taste, or a shape taste can be obtained. Accordingly, not only in those cases presenting difficulties in aftertastes but also in cases where the taste of a foodstuff is desired to be improved to a refreshing or light taste is effective to incorporate sclareolide having the structure:

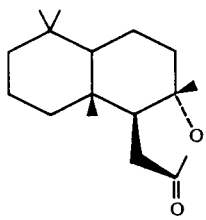

With respect to application of the sclareolide to foodstuffs the use in combination with chemical substances (oxobicyclooctane derivatives and the like) having an aroma or taste improving effect is disclosed in U.S. Pat. Nos. 4,197,328, 4,208,308, 4,225,470, 4,229,314, 4,273,662, 4,294,708, 4,198,398, 4,454,111 and 4,849,238 the specifications of which are incorporated herein by reference.

Kinds of foodstuffs to which the present invention may be applied (with respect to aftertaste) are not particularly limited but as described above, the sclareolide exhibits a marked effect in improving aftertaste such as a sweet aftertaste, or an astringent aftertaste. Therefore the present invention is highly effective for foodstuffs which have sweet and astringent components and in which improvement in taste quality is desired. Specific examples of foodstuffs having a sweet taste include various sweeteners (irrespective of forms, such as powders, granules, cubes, paste and liquids), beverages such as carbonate beverages, milk beverages; foods, such as candies, fondants, icings, jellies, mousses, chocolates, cookies, cakes, ice creams, sherbets, chewing gums, sweet pickles, dressings, vinegars, sweet wines, etc. Examples of foodstuffs having an astringent taste include tea and foods containing components such as tannin; persimmons and the like. In the case of containing low calorie sweeteners such as aspartame which is a sweetener having a high titer, alitame, sucrarose, and the like, especially in the case of containing aspartame, aftertastes are improved and foodstuffs having a high preference can be obtained. In addition, the low calorie sweetener may also include saccharin, cyclamate, acesulfame, stevioside, ribaudioside, sugar-added stevia, glycyrrhizin, thaumatin, and the like. The amount of aspartame effective for improving the taste quality of low calorie sweeteners varies depending upon various conditions such as the kind or the concentration of sweetner, components used in combination, and the like. For example, in the case of aspartame, approximately 1 ppm to 1000 wt percent of sclareolide based on the weight of aspartame are preferred.

In matters other than foodstuffs, for example, toothpastes, gargles, oral drugs (including herb medicines) and the like, the taste quality can be markedly improved by incorporatin the sclareolide therein. The effective concentration of the sclareolide can be the same in these other foodstuffs as in the above described foodstuffs.

According to the present invention the taste quality, especially aftertaste properties of foodstuffs and the like can be marketedly improved by incorporating the sclareolide therein. The content of this component in a trace amount so that the taste quality of the foodstuff is not effected as a whole and texture is not damaged (but actually improved). Further, in the case of aspartame and the like sweet beverages and foodstuffs so sweet as having good qualities similar to sugar but having low caloric content can be provided.

Potassium Chloride Debitterment

This invention relates to the use in enhancing the taste of meat flavored, cheese flavored and savory flavored foodstuffs, animal foods and snacks, to wit:
 (A) Dairy Type Foods
  (i) processed cheese;
  (ii) cheese spread;
  (iii) cheese dip;
  (iv) cheese analogues and imitation cheese analogues;
 (B) Animal Foods
  (i) dog foods;
  (ii) cat foods;
 (C) Savory Flavored Foods
  (i) extruded snacks;
  (ii) crackers, pretzels, potato chips and the like;
  (iii) meat sauces, white sauces and gravies;
  (iv) casseroles;

(v) cheese sauces;
(vi) soups (instant and finished)
(vii) prepared meats and meat spreads;
(viii) meat and poultry analogues and extenders and the like;
(ix) margarine;
(x) salad dressings
(xi) condiments;
(xii) seasonings and flavorings;
(xiii) meat and poultry (processed); and
(xiv) breading and stuffing.

In this aspect of our invention the sclareolide is used in conjunction with a composition of matter consisting essentially of:

(a) from about 0.25 up to about 0.80 mole percent (herein and hereinafter to be understood as meaning a percentage based on total moles of cations, anions, and substantially non-ionized organic acids) on a dry basis of a lactic acid/lactate species mixture having the structures:

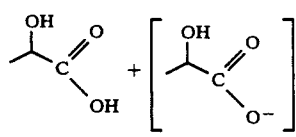

(b) from 0 up to about 0.09 mole percent on a dry basis of glycollic acid/glycollate ion species mixture having the structure:

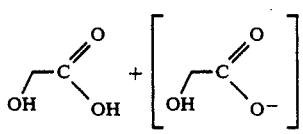

(c) from 0 up to about 10.0 mole percent on a dry basis of magnesium ion;

(d) from about 6 mole percent up to about 50 mole percent on a dry basis of a phosphate/monoacid phosphate/diacid phosphate/phosphoric acid species mixture having the formula:

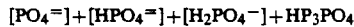

taken alone or taken further together with at least one of the species tripolyphosphate, pyrophosphate and/or polymetaphosphate (e.g., $K_5P_3O_{10}$; $K_4P_2O_7$; $[KPO_3]_x$ respectively, wherein x represents a repeating number of monomeric units to form a polymer);

(e) from 0 mole percent up to about 40 mole percent on a dry basis of sodium ion;

(f) from about 8 mole percent up to about 50 mole percent on a dry basis of potassium ion;

(g) from about 0.3 mole percent up to about 16 mole percent on a dry basis of chloride ion;

(h) from 0 mole percent up to 30 mole percent on a dry basis of carbonate/bicarbonate/carbonic acid species mixture having the formula:

$[CO_3^=]+[HCO_3^-]+H_2CO_3$ (i) from 0 mole percent up to about 2.0 mole percent on a dry basis of monobasic glutamate/dibasic glutamate/glutamic acid species having the formulae:

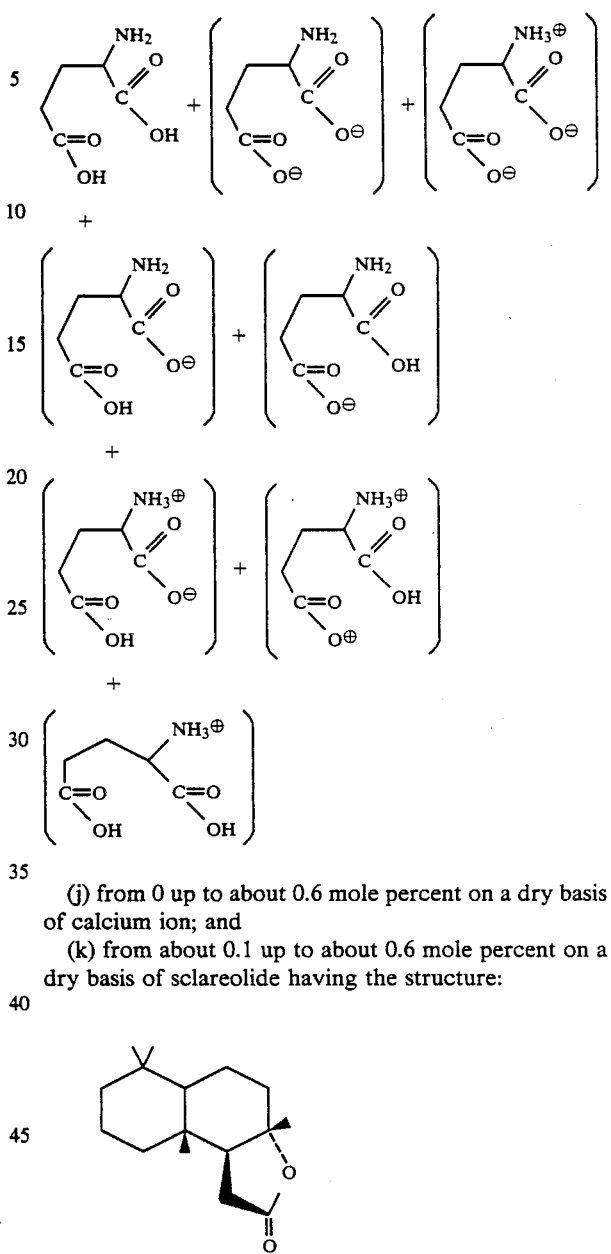

(j) from 0 up to about 0.6 mole percent on a dry basis of calcium ion; and (k) from about 0.1 up to about 0.6 mole percent on a dry basis of sclareolide having the structure:

with the proviso that the sum total of mole percent on a dry basis of sodium ion, potassium ion, magnesium ion and calcium ion if from about 48 mole percent up to about 60 mole percent; and with the proviso that the sum total of carbonate/bicarbonate/carbonic acid ion species mixture having the structure:

taken further together with the sum total mole percent on a dry basis of the phosphate/monobasic phosphate/dibasic phosphate species mixture having the formula:

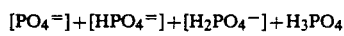

taken alone or taken further together with the species tripolyphosphate, pyrophosphate and/or polymetaphosphate is from about 34 mole percent up to about 50 mole percent.

The foregoing composition when in aqueous solution (e.g., a soup such as chicken soup or clam chowder) has a pH in the range of from about 6 up to about 10.

In said aqueous solution, the concentrations of ion and acid species are:

(a) from about $2\times10^{-4}$ up to about $7\times10^{-4}$ moles per liter of the lactic acid/lactate ion species defined according to the structures:

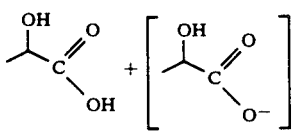

(b) from 0 up to about $9\times10^{-5}$ moles per liter of the species glycollic acid/glycollate ion defined according to the structures:

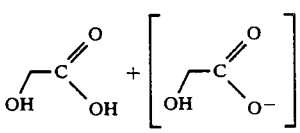

(c) from 0 moles per liter up to about $1.5\times10^{-3}$ moles per liter of the ion/acid species, glutamic acid/monobasic glutamate/dibasic glutamate defined according to the structures:

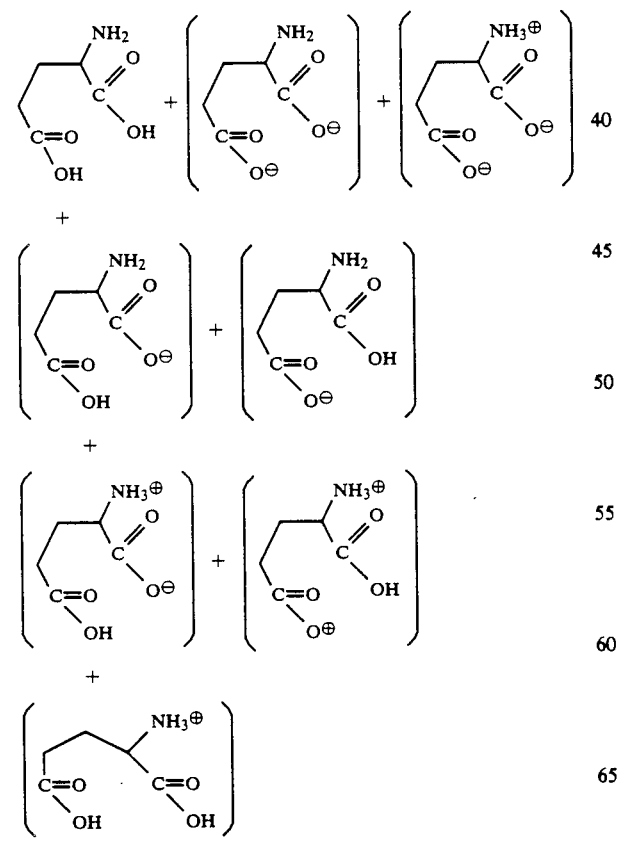

(d) from about $3\times10^{-4}$ up to about $1.6\times10^{-2}$ moles per liter of the chloride ion species;

(e) from about $3\times10^{-3}$ up to about $1\times10$ moles per liter of the acid/ion species, phosphoris acid/ion species, phosphoric acid/monoacid phosphate/diacid phosphate/phosphate having the formula:

$$[PO_4^{5-}]+[HPO_4^=]+[H_2PO_4^-]+H_3PO_4$$

taken alone or taken further together with the species tripolyphosphate (e.g., $K_5P_3O_{10}$); pyrophosphate (e.g., $K_4P_2O_7$); and/or polymetaphosphate (e.g., $[KPO_3]$ x wherein x represents a repeating number of monomeric units to form a polymer);

(f) from 0 up to about $2\times10^{-3}$ moles per liter of the ion/acid species carbonate/bicarbonate/carbonic acid having the formula:

$$[CO_3^=]+[HCO_3^-]+H_2CO_3$$

(g) from 0 up to about $4\times10^{-2}$ moles per liter of the sodium ion species;;

(h) from about $4\times10^{-3}$ up to about $9\times10^{-2}$ moles per liter of the potassium ion species;

(i) from about 0 up to about $1\times10^{-2}$ moles per liter of the magnesium ion species;

(j) from about 0 up to about $6\times10^{-4}$ of the calcium ion species; and (k) from about $1\times10^{-3}$ about $6\times10^{-3}$ of the sclareolide having the structure:

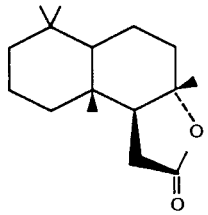

with the provisos:

(i) that the mole ratio of metal cation:total acid and ion is from about 0.4 up to about 0.7;

(ii) that the concentration of ions and acids is from about 0.04 up to about 0.25 moles per liter; and (iii) that the range of concentration of metal cations is from about 0.02 up to about 0.15 moles per liter.

Preferably, the composition of matter of our invention is limited to a mixture of:

(i) from about 60 weight percent up to about 96 weight percent on a dry basis of a substance selected from the group consisting of (a) $KH_2PO_4$ or (b) $K_2HPO_4$ or (c) a mixture of $Mg_3 (PO_4). (4H_2O$ and $K_2CO_3$;

(ii) from about 0.4 up to about 3.5 weight percent on a dry basis of lactic acid;

(iii) from about 0.4 up to about 17.0 weight percent on a dry basis of a compound selected from the group consisting of sodium chloride, postassium chloride and calcium chloride; and (iv) from about 1.75 up to about 3.25 weight percent on a dry basis of monosodium glutamate or monopotassium glutamate of a mixture of same (with the proviso that the sum total of the ingredients cannot be greater than 100%).

More preferably, the composition of our invention consists essentially of the foregoing mixture with the following limitations:

(i) from about 60 weight percent up to about 96 weight percent on a dry basis of a substance selected from the group consisting of (a) $KH_2PO_4$ or (b) $K_2HPO_4$ or (c) a mixture of $Mg_3(PO_4).4H_2O$ and $K_2CO_3$;

(ii) from about 0.4 up to about 3.5 weight percent on a dry basis of lactic acid;

(iii) from about 0.4 up to about 17.0 weight percent on a dry basis of a compound selected from the group consisting of sodium chloride, potassium chloride and calcium chloride;

(iv) from about 1.75 up to about 3.25 weight percent on a dry basis of monosodium glutamate or monopotassium glutamate or a mixture of same; and, in addition (v) from about 4.0 weight percent up to about 25.0 weight percent of a compound selected from the group consisting of $MgCo_3$ $KHCO_3$ and $NaHCO_3$ (with the proviso that the sum total of the ingredients cannot be greater than 100%).

We have discovered that the foregoing composition brings out the bloody, "rare meat" notes in meat flavored foodstuffs, e.g., hamburgers, sausages, steaks and the like. Furthermore, the foregoing composition causes vegetarian meat compositions to have a "rare meat" note thereby causing these vegetarian meat compositions to be more palatable and aesthetically pleasing. We have also discovered that the use of the foregoing compositions enhances the flavor of cheese snack foods and brings out the natural cheese character of the cheese snack foods while requiring a lesser quantity of sodium chloride than that ordinarily required in such cheese snack foods.

According to the present invention 3,5'-nucleotides or their alkali metal salts may be also used in conjunction with the salts and the sclareolide but, in all cases the amount of 5'-nucleotide which is useful is much less than that ordinarily required as in the case of, for example, U.S. Pat. No. 3,318,710 issued on May 9, 1967.

The foregoing salt/sclareolide composition aids in elimination of the well known "potassium ion after taste" in, for example, barbecue types of tastes and, in a number of examples can substantially or even entirely replace sodium salts and/or monosodium glutamate with a non-sodium ion and/or non-glutamate ion containing substances.

The mixed seasonings according to the present invention can be used to alter, vary, fortify, modify, enhance or otherwise improve the organoleptic properties, including flavor and/or aroma, of a wide variety of materials which are ingested, consumed, or otherwise organoleptically sensed by mammalian species including human beings and pets, e.g., cats and dogs.

The term "alter" in its various forms will be understood herein to mean the supplying or imparting a flavor character or note to an otherwise bland, relatively tasteless substance, or augmenting an existing flavor characteristic where the natural flavor is deficient in some regard, or supplementing the existing flavor or aroma impression to modify the organoleptic character. The materials which are so altered are generally referred to herein as consumable materials.

Such mixed seasonings according to the present invention are accordingly useful in flavoring compositions. Flavoring compositions are herein to mean those which contribute a part of the overall flavor impression by supplementing or fortifying a natural or artificial flavor in a material, as well as those which supply substantially all the flavor and/or aroma to a consumable article.

The term "foodstuff" as used herein includes both solid and liquid ingestible materials for man or animals, which materials usually do, but need not, have nutritional value. Thus, foodstuffs includes meats, gravies soups and convenience foods, vegetables, snack foods, dog and cat foods, other veterinary products, and the like.

When the mixed seasonings according to this invention are used in a food flavoring composition, they can be combined with conventional flavoring materials or adjuvants. Such coingredients or flavoring adjuvants are well known in the art for such use and have been extensively described in the literature. Apart from the requirement that any such adjuvant material be ingestibly acceptable, and thus non-toxic or otherwise non-deleterious, conventional material can be used and broadly include other flavor materials, vehicles, stabilizers, thickeners, surface active agents, conditions and flavor intensifiers.

Examples of preferred co-flavoring adjuvants are:
Methyl thiazole alcohol (4-methyl-5-$\beta$-hydroxyethyl thiazole);
2-Methyl butanethiol;
4-Mercapto-2-butanone;
3-Mercapto-4-pentanone;
1-Mercapto-2-propanone;
Benzaldehyde;
Furfural;
Furfural alcohol;
2-Mercapto propionic acid;
2-Methylfuran-3-thiol;
2-Methyldihydrofuran-3-thiol;
2-Methyltetrahydrofuran-3-thiol;
2-Ethylfuran-3-thiol;
2-Ethyldihydrofuran-3-thiol;
Methyl pyrazine;
2-Ethyl-3-methyl pyrazine;
Tetramethyl pyrazine;
Dipropyl disulfide;
Methyl benzyl disulfide;
Allyl thiophenes;
2-Butyl thiophene;
2,3-Dimethyl thiophene;
5-Methyl furfural;
Acetyl furan;
2,4-Decadienal;
Guiacol;
Phenyl acetaldehyde;
$\delta$-Decalactone;
d-Limonene;
Acetoin;
Amyl acetate;
Maltol;
Ethyl butyrate;
Levulinic acid;
Piperonal;
Ethyl acetate;
N-Octanal;
n-Pentanal;
n-Hexanal;
Diacetyl;
Monosodium glutamate;
Sulfur-containing amino acids;
Cysteine;

Hydrolyzed vegetable protein;
Hydrolyzed fish protein; and
Tetramethyl pyrazine.

The mixed seasonings, (including sclareolide having the structure:

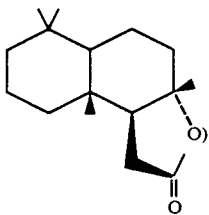

or the compositions incorporating them, as mentioned above, can be combined with one or more vehicles or carriers for adding them to the particular product Vehicles can be edible or otherwise suitable materials such as ethyl alcohols, propylene glycol, water and the like. Carriers include materials such as gum arabic, carragennan, other gums, and the like. The mixed seasonsings according to this invention can be incorporated with the carriers by conventional means such as spray-drying, drum-drying, and the like. Such carriers can also include materials for coacervating the mixed seasons (and other flavoring ingredients, as present) to provide encapsulated products. When the carrier is an emulsion the flavoring composition can also contain emulsifiers such as mono- and diglycerides of fatty acids and the like. With these carriers or vehicles, the desired physical form of the composition can be prepared.

The quantity of mixed seasonings (including sclareolide having the structure:

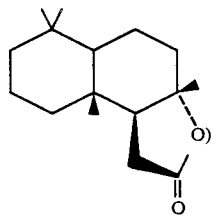

or mixtures thereof utilized should be sufficient to impart the desired flavor characteristic to the product, but on the other hand, the use of an excessive amount of the derivative is not only wasteful and uneconomical, but in some instances too large a quantity may unbalance the flavor or other organoleptic properties of the product consumed. The quantity used will vary depending upon the ultimate foodsuff; the amount and type of flavor initially present in the foodstuff; the further process or treatment steps to which the foodstuff will be subjected; regional and other preference factors; the type of storage, if any, to which the product will be subjected; and the preconsumption treatment, such as baking, frying, and so on, given to the product by the ultimate consumer. Accordingly, the terminology "effective amount" and "sufficient amount" is understood in the context of the present invention to be quantitatively adequate to alter the flavor of the foodstuff.

It is accordingly preferred that the ultimate foodstuff (e g., snack or soup or the like) compositions contain:

(i) on a dry basis from about 0.5% up to about 25%; and (ii) on a wet basis from about 0.02% up to about 1.5%.

More specifically, the range in dry soups is from about 2.0 up to about 10% and the range in the aqueous soup ("ready to eat") is from about 0.05% up to about 0.2%.

The amount of mixed seasonings (including sclareolide having the structure:

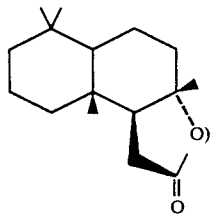

of our invention to be utilized in flavoring compositions can be varied over a wide range depending upon the particular quantity to be added to the foodstuff. Thus, amounts of one or more seasonings according to the present invention, of from about 0.5% up to 100% of the total "flavoring" composition can be incorporated in such compositions. Thus, for example, in snack foods, between 30 and 35% of the flavored coating of the snack food is the seasoning of our invention.

C. USE OF SCLAREOLIDE AS FAT SUBSTITUTE IN ICE CREAM AND THE LIKE

Sclareolide having the structure:

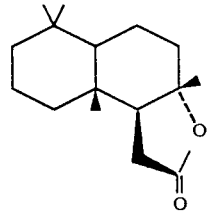

may be used in dairy products such as ice cream, sour cream and whipped toppings. 50 Percent of a full fat chocolate ice cream can be replaced by 2.0% of sclareolide which also improves the iciness, mouthfeel and texture of the fat reduced product. It can also be used to improve the characteristics of very low fat frozen deserts ... 2½% to chocolate and 1% to a vanilla formulation and the products were very creamy and smooth with a rich mouthfeel.

The following examples are given to illustrate embodiments of the invention as it is preferred to practice it. It will be understood that these examples are illustrative and the invention is not to be considered as restricted thereto except as indicated in the appended claims.

EXAMPLE I-VII

The following table sets forth mixtures of salts (with each salt given as a weight percentage) to produce the mixed seasonings of our invention. Each mixture is given as a separate example. Each of the mixtures of each of the examples will be used in examples following Example XVI.

TABLE I

| Ingredient | I | II | III | IV | V | VI | VII |
|---|---|---|---|---|---|---|---|
| $KH_2PO_4$ | — | 72.38 | 73.12 | 72.42 | 75.62 | — | — |
| Lactic Acid 22% | 3.09 | 2.09 | 2.11 | 2.09 | 2.18 | 3.0 | 2.29 |
| Glycolic Acid 85% | 0.08 | 0.05 | — | — | — | — | — |
| $Mg_3(PO_4)_2 \cdot 4H_2O$ | 10.90 | — | — | — | — | — | — |
| $CaHPO_4 \cdot 2H_2O$ | 0.90 | 0.61 | — | 0.61 | 0.50 | 0.70 | — |
| NaCl | 5.24 | 3.54 | 3.58 | 3.54 | 3.70 | 5.10 | 15.22 |
| KCl | 0.52 | 0.35 | — | 0.35 | 0.38 | 0.50 | 0.38 |
| Monosodium Glutamate·$H_2O$ | 2.90 | 1.96 | 1.98 | 1.96 | 2.06 | 2.82 | 2.15 |
| $NaHCO_3$ | 22.02 | — | 15.04 | 14.90 | 15.56 | 21.38 | — |
| $KHCO_3$ | — | 14.89 | — | — | — | — | — |
| $K_2CO_3$ | 54.35 | — | — | — | — | — | — |
| $MgCO_3$ | — | 4.13 | 4.17 | 4.13 | — | — | — |
| $K_2HPO_4$ | — | — | — | — | — | 66.50 | 79.24 |
| Calcium Chloride | — | — | — | — | — | — | 0.72 |
| Sclareolide | 0.12 | 0.12 | 0.12 | 0.12 | 0.12 | 0.12 | 0.12 |

EXAMPLES VIII-XVI

The following Table II sets forth mixtures of non-sodium-containing salts to produce mixed seasonings of our invention. Each mixture is given as a separate example. Each of the mixtures of each of the examples will be used in examples following the instant Examples VIII–XVI.

TABLE II

| Ingredient | VIII | IX | X | XI | XII | XIII | XIV | XV | XVI |
|---|---|---|---|---|---|---|---|---|---|
| $KH_2PO_4$ | 90.98 | 85.94 | 89.16 | 94.06 | 86.61 | 92.18 | 95.90 | 79.24 | 93.84 |
| Lactic Acid 22% | 2.62 | 2.48 | 2.57 | 4.24 | 3.91 | 4.16 | 2.77 | 2.29 | 2.71 |
| $CaHPO_4 \cdot 2H_2O$ | 0.77 | 0.72 | 0.75 | 0.99 | 0.91 | 0.97 | — | — | — |
| $CaCl_2$ | — | — | 0.43 | — | — | — | 0.87 | 0.72 | 0.85 |
| KCl | 0.44 | 3.96 | — | 0.71 | 5.75 | 0.69 | 0.46 | 15.60 | 0.45 |
| $MgCO_3$ | 5.19 | 4.90 | 5.08 | — | — | — | — | — | — |
| Monopotassium Glutamate·$H_2O$ | — | 2.00 | 2.00 | — | 2.82 | 2.00 | — | 2.15 | 2.15 |
| Sclareolide | 0.24 | 0.24 | 0.24 | 0.24 | 0.24 | 0.24 | 0.24 | 0.24 | 0.24 |

TABLE III

| Ingredient | VIII | IX | X | XI | XII | XIII | XIV | XV | XVI |
|---|---|---|---|---|---|---|---|---|---|
| $K^+$ | 45.3% | 45.6% | 45.5% | 49.30% | 49.3% | 49.3% | 49.0% | 49.2% | 49.0% |
| $H_2PO_4^-$ | 45.0% | 41.6% | 44.4% | 48.60% | 43.2% | 47.9% | 48.6% | 35.7% | 47.8% |
| $HPO_4^=$ | 0.3% | 0.276% | 0.297% | 0.402% | 0.359% | 0.399% | — | — | — |
| $Ca^{++}$ | 0.3% | 0.277% | 0.297% | 0.722% | 0.359% | 0.399% | 0.545% | 0.401% | 0.515% |
| $Cl^-$ | 0.398% | 3.5% | 0.392% | 0.662% | 5.25% | 0.658% | 1.51% | 13.61% | 1.49% |
| $Mg^{++}$ | 4.15% | 3.84% | 4.11% | — | — | — | — | — | — |
| $CO_3^=$ | 4.15% | 3.84% | 4.11% | — | — | — | — | — | — |
| Lactic acid | 0.434% | 0.396% | 0.425% | — | 0.646% | 0.694% | 0.465% | 0.342% | 0.458% |
| Glutamate ion | — | 0.65% | 0.668% | — | 0.942% | 0.696% | — | 0.650% | 0.735% |

TABLE IV

| Ingredient | VIII | IX | X | XI | XII | XIII | XIV | XV | XVI |
|---|---|---|---|---|---|---|---|---|---|
| Mole ratio of metal cation: anion + cation + free acids | 0.498 | 0.499 | 0.498 | 0.497 | 0.497 | 0.496 | 0.495 | 0.496 | 0.496 |

The mixed seasonings of Example I-XVI are used in the following Example XVII, et seq.:

EXAMPLE XVII

The following ingredients are refluxed for four hours:

| Ingredient | Parts by Weight |
|---|---|
| L-Cysteine hydrochloride | 0.09 |
| Carbohydrate-free vegetable protein hydrolysate | 30.09 |
| Thiamine hydrochloride | 0.9 |
| Water | 67.30 |

The resulting mixture is then aged for three days and an aliquot portion is withdrawn and dried. Based on the weight of the dry solid obtained, sufficient gum arabic is added to the batch to provide a composition containing one part by weight of gum arabic. The composition is then spray-dried.

Ethyl(2-methyl-3-furyl) disulfide is added to the spray-dried material at the rate of 4 ppm.

The resulting material has a beef liver flavor. To this material is added, in separate portions, each of the mixed seasonings of any one of Examples I-XVI at levels of 4%, 8%, 12%, 15% and 25%.

Each of the resulting materials has an excellent "rare" beef liver flavor which can be added to "well done" cooked liver in the form of gravies causing the "well done" cooked liver to have a rare flavor nuance.

EXAMPLE XVIII

A beef liver gravy is made by formulating a composition in the amounts indicated:

| Ingredients | Parts by Weight |
|---|---|
| Cornstarch | 10.50 |
| One of the final product of Example VIII | 3.00 |

-continued

| Ingredients | Parts by Weight |
| --- | --- |
| Caramel color | 0.30 |
| Garlic powder | 0.05 |
| White pepper | 0.05 |
| Sodium Chloride | 1.90 |
| Monosodium glutamate | 0.20 |

To one unit of gravy flavor concentrate, six ounces of water is added and the mixture is stirred thoroughly to disperse the ingredients, brought to a boil, simmered for one minute, and served. This "meatless" gravy exhibits an excellent rare beef-liver flavor.

EXAMPLE XIX

Seven ppm of ethyl (2-methyl-3-furyl) disulfide is added to beef broth prepared from a commercial dried mixture and 250 ml hot water. To the resulting material is added at a level of 0.1% each of the mixed seasonings of Examples I-XVI. The ethyl (2-methyl-3-furyl) disulfide increases the beef-liver character and imparts a pleasant nutty note. The mixed seasonings cause the overall beef broth to have a "rare liver" nuance. The resultant beef broth has an excellent improved more blended meaty/rare flavor than does the unflavored beef broth.

EXAMPLE XX

The following ground sausage is prepared:

| Ingredient | Parts by Weight |
| --- | --- |
| Ground beef | 200.0 |
| Beef suet | 120.0 |
| Ice/NaCl (50:50 mixture) | 200.0 |
| Potato flour | 100.0 |
| Anhydrous bread crumbs | 140.0 |
| Dry milk powder | 20.0 |
| Standard spice flavor containing: | 10.0 |
| Oil of cumin | 1.6 |
| Oil of mustard | 3.3 |
| Oil of celery | 3.3 |
| Oil of ginger | 5.2 |
| Oil of cloves | 14.3 |
| Oil of coriander | 17.6 |
| Oil of pimenta berries | 22.0 |
| Oil of black pepper | 43.0 |
| Oleoresin capsicum | 373.0 |
| Oil of nutmeg | 500.0 |

To the above mixture 0.02% by weight of the following mixture is added:

| Ingredient | Parts by Weight |
| --- | --- |
| n-Propyl (2-methyl-3-furyl) disulfide | 5.0 |
| Ethyl alcohol (95%) | 95.0 |

To the resulting mixture is added at a level of 100 parts by weight to seven portions of the resulting mixture are added, separately, each of the mixed seasonings produced according to Examples I-XVI.

The resulting mixtures are then formed into sausages and encased in the usual manner. The encased sausage are heated in water at a temperature of 160°-180° F. for a period of two hours. Each of the sausages has a rare liver-taste reminiscent of the taste of sausage made with natural liver and also containing the rare desirable bloody notes.

EXAMPLE XXI

A mixture of 8.8 grams of cysteine-hydrochloride 8.8 grams of thiamine hydrochloride and 309.4 grams of carbohydrate-free vegetable protein hydrolysate (Nestle 4BE) is brought to a standard weight of 1000 grams by addition of water and adjusted to a pH of 4.75 with acid or base as required. This mixture is then boiled under reflux conditions at atmospheric pressure for four hours and allowed to cool.

After the mixture is allowed to cool, one gram of isoamyl (2-methyl-3-furyl) disulfide and 0.25 grams of one of the mixed seasonings prepared according to Examples I-XVI is added thereto (seven separate portions of flavor). The resulting mixture thus obtained has an excellent unique roasted, rare bloody liver meaty flavors with chicken meat nuances.

EXAMPLE XXII

The following ingredients refluxed for four hours:

| Ingredients | Parts by Weight |
| --- | --- |
| L-Cysteine hydrochloride | 0.9 |
| Carbohydrate-free vegetable protein hydrolysate | 30.9 |
| Thiamine hydrochloride | 0.9 |
| One of the mixed seasonings of one of Examples I-XVI | 7.8 |
| Water | 67.30 |

The resulting mixture is then aged for three days and an aliquot portion is withdrawn and dried. Based on the weight of the dry solid obtained, sufficient gum arabic is added to the batch to provide a composition containing one part by weight of gum arabic. The composition is then spray-dried.

n-Heptyl (2-methyl-3-furyl) disulfide is added to the spray-dried material at the rate of 4 ppm.

The resulting material has an excellent rare roast beef flavor.

EXAMPLE XXIII

A roast beef gravy is made by formulating a composition in the amounts indicated:

| Ingredients | Parts by Weight |
| --- | --- |
| Cornstarch | 10.50 |
| The final product of Example XXII | 3.00 |
| Caramel color | 0.30 |
| Garlic powder | 0.05 |
| White pepper | 0.05 |
| Salt | 1.92 |
| Monosodium glutamate | 0.20 |

To one unit of gravy flavor concentrate, 0.2 parts by weight and one of the mixed seasonings of Examples I-XVI is added and eight ounces of water is added. The mixture is stirred thoroughly to disburse the ingredients, brought to a boil, simmered for one minute, and served. This "meatless" gravy exhibits an excellent rare roast beef flavor.

EXAMPLE XXIV(A)

CHEESE FLAVOR

Skim milk having 22 percent total solids was heated to 145° F. for 30 minutes to substantially destroy any pathogens and to reduce the number of competitive organisms. The skim milk was then cooled to 92° F. and placed in a sterile fermenter having one-fifth of its volume as a head space. The fermenter was maintained at 92° F. The skim milk was inoculated with approximately 3,000 organisms per gram of the medium of the organism S.lactis-variation diacetilactis (citrate fermenter) and approximately 3,000 organisms per gram of the medium of the organism S.lactis-variation diacetilactis (citrate non-fermenter). The skim milk was also inoculated with approximately 2,000 organisms per gram of aqueous medium of B.megatherium and approximately 2,000 organisms per gram of the medium of B.megaterium. The inoculated skim milk was maintained at 92° F. for 5 days during which the organisms therein proliferated.

EXAMPLE XXIV(B)
PRODUCTION OF THE CHEESE FLAVOR

Skim milk having 15 percent total solids was heated to 145° F. for 30 minutes to substantially destroy pathogens and to reduce the number of competitive organisms. The skim milk was cooled to 92° F. and placed in a fermenter maintained at 92° F. The skim milk was then inoculated with the product of Example XXIV(A) wherein the resulting inoculated skim milk had a total of approximately 10,000 organisms per gram of skim milk and a ratio of the Bacillus organisms to the Streptococcus organisms was approximately 60/40. The inoculated skim milk was stirred for 35 minutes to disperse the organisms therein. The inoculated skim milk was then sealed in an airtight manner in the fermenter and 1/5 of the volume of the fermenter remained as a head space. Fermentation was carried out at 95° F. for three days. Thereafter, the fermenter was opened under a blanket of nitrogen and cut particles of naturally produced cheddar cheese was placed in the fermentation medium. The amount of cheese added, on a solid basis of the fermentation medium and cheese added, was approximately 33 percent by weight. The fermenter was closed and stirring was carried out until the cheese was suspended. The stirring time was about 1½ hours. Fermentation was then allowed to resume for an additional one day. The mixture of cheese and fermantation produced was pasteurized at 145° F. for 30 minutes and then spray dried in a conventional manner to a fine powder having a complete cheddar cheese taste and taste feel.

EXAMPLE XXIV(C)

On a dry basis was mixed 50 percent solids of Examples XXIV(B) 31.3 percent acid whey powder, 4 percent mixed seasonings (individually of one of the Examples I-XVI 5 percent disodium phosphate (a dispersing agent), 0.5 percent USDA Yellow No. 5, the remainder being dry milk solids. After thorough mixing a portion thereof was dispersed with vigorous stirring in water and spray dried to form a cheese flavored powder. The cheese powder was a fine textured powder having a very distinctive and medium degree of improved natural-like cheddar cheese flavor.

EXAMPLE XXIV(D)

A second portion of the product of Example XXIV(C) was mixed with an equal portion of weight of milk solids and produced a cheddar cheese spread of mild cheese flavor.

EXAMPLE XXIV(E)

A third portion of the product of Example XXIV(C) was mixed with an equal portion of vegetable fats and produced a mild cheddar cheese dip.

EXAMPLE XXIV(F)

Equal portions of the product of Example XXIV(C) and whey solids were mixed to produce a medium to mild cheese flavored powder for sprinkling on salads and the like.

EXAMPLE XXIV(G)

On a dry weight basis, there was mixed 50 percent of the fermented solids of Example XXIV(B), 25 percent acid whey powder, 15 percent butter fat, 0.5 percent Atmos 150, 4 percent of one of the mixed seasonings of Examples I-XVI, 5 percent disodium phosphate and 0.5 percent USDA Yellow No. 5. This product after being thoroughly mixed was cut into wedges and produced an excellent natural like cheddar cheese flavor product.

EXAMPLE XXV

The following dry soup mix is prepared:

| Ingredients | Parts by Weight |
| --- | --- |
| Chopped chicken fat | 3.0 |
| Ground chicken meat | 4.0 |
| Mixed seasoning of one of Examples I-XVI | 8.0 |
| Monosodium glutamate | 6.0 |
| Dextrose | 3.0 |
| Onion powder | 0.7 |
| Enxymatically hydrolyzed yeast | 0.5 |
| Turmeric | 0.118 |
| Parsley | 0.04 |
| Sage | 0.01 |
| Noodles | 32.0 |

The mixture is then simmered in 800 cc. of water for 7 minutes, and soup having a seasoned chicken flavor results and even more improved chicken flavor results when chicken fat employed is first mixed with 0.18 cc. of ethanol containing 10% by weight of arachidonic acid.

EXAMPLE XXVI

Two chicken flavors are prepared by refluxing the following ingredients at about 95° C. for 2 hours:

| Ingredients | A | B |
| --- | --- | --- |
| Corn gluten hydrolysate | 37.92 | 45.17 parts |
| Xylose | 0.19 | 0.5 |
| Thiamine HCl | 1.14 | 1.5 |
| Nucleotides* | 0.75 | — |
| Mixed seasonings of Example IV | 0.35 | 0.42 |
| Water | 60.00 | 52.00 |

*50/50 mixture of sodium inosinate and sodium guanylate.

After drying, 16.31 parts by autolysed yeast extract are added to formula A. The product of formula B is dry blended with 19.43 parts of autolysed yeast and 0.83 parts of nucleotides. Both products have a very pleasant seasoned chicken flavor.

EXAMPLE XXVII

BOLOGNA SAUSAGE

Beef and pork were separately treated and left to stand for 2 days to be impregnated with one of the mixed seasonings of Examples I-XVI, and potassium nitrate added hereto. Then, they were removed and ground by separate meat choppers. Lean meat from each ground meat was put together and treated by a cutter. To the mixed meat being cut, 5'-guanylic acid was added in the form of the calcium salt in one sample lot and the disodium salt in the other sample lot, in an amount corresponding, as 5'-guanylic acid, to 70 mgs. percent based on the total weight of the meat used. Then, the resultant meat paste, after addition therto of fat was forced into a tubular case with the aid of a stuffer. The case was bound at intervals of 25 cms. Finally, the case was dried at 40° C. for 1 hour, smoked at 65° C. for 3 hours, heated in water at 75° C. for 1.5 hours, and cooled to provide a Bologna sausage. The residual ratio of 5'-guanylic acid in the product incorporating its calcium salt was found to be 60% as compared with 32% in the product incorporationg its disodium salt. The resulting Bologna sausage had excellent seasoned meat flavor highly superior to Bologna sausages known in the prior art.

EXAMPLE XXVIII(A)

To 6.4 grams of 4-hydroxy-2,5-dimethyl-2,3-dihydrofuran-3-one in a buffer solution containing about 35 grams sodium acetate, about 14 grams of acetic acid and 400 ml of water (pH 5.0), a solution of 12 grams of sodium sulphide ($Na_2S.9H_2O$) in 200 ml of water was added over a period of 30 minutes. The mixture was then boiled under reflux conditions at atmospheric pressure for 2 hours and allowed to cool. The pH was then 6.6.

| EXAMPLE XXVIII(B) A gravy was prepared from the following ingredients: ||
|---|---|
| Ingredients | Grams |
| Potato starch | 15.0 |
| Onion powder | 2.5 |
| Monosodium glutamate | 3.0 |
| beef tallow | 20.0 |
| Flour | 15.0 |
| Caramel | 1.6 |
| Pepper | 0.02 |
| Bayleaves | 0.02 |
| Clove | 0.02 |
| One of the mixed seasonings of Examples I-XVI | 8.0 |
| Protein hydrolysate | 4.0 |
| Beef extract powder | 2.0 |
| Tomato powder | 1.0 |
| | 72.16 |

The potato starch and flour were added to the molten beef tallow at 60° C. under continuous stirring. The other ingredients were well blended and likewise added to the beef tallow. The whole mixture was boiled in 1 liter of water.

The gravy so obtained was divided, into two portions of 500 ml. In the first portion 250 mg of malto-dextrin was dissolved; in the second portion 250 mg of the flavour powder prepared according to Example XXVIII(A). Both gravies were assessed in a paired comparison test by a panel consisting of 12 persons.

The gravy containing the flavour powder was preferred by 10 out of the 12 tasters because of its more pronounced fried-meat flavour with an excellent bloody note.

EXAMPLE XXIX

The following ingredients were introduced into a cooking vessel and heated to popping temperature:

| Ingredient | |
|---|---|
| Encapsulated Bleu Cheese Flavor | 3.6 grams |
| Soybean Oil | 55 cc's |
| Popcorn | 80.0 grams |
| The mixed seasoning of Example III | 4.0 grams |

The resulting popcorn had a decided blue cheese flavor which was excellently seasoned which was uniformly distributed and did not lose potency of the flavor or the seasoning after several days.

A method of production of flavored popcorn is set forth in detail in U.S. Pat. 4,096,281 issued on June 20, 1978 the disclosure of which is incorporated by reference herein.

EXAMPLE XXX

Sclareolide having the structure:

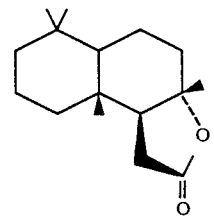

is added to a cup of black coffee at the rate of 0.001 ppm. The bitterness of black coffee is significantly depressed compared to a cup of black coffee not containing the sclareolide.

The sclareolide added to the cup of black coffee at the rate of 0.001 ppm is now made up into solution containing 0.1% sclareolide at the rate of 1% in 95% aqueous food grade ethanol. The 95% food grade ethanol solution of the sclareolide is then added to water to cause the solution to be a concentration of 0.01% (with respect to sclareolide) in the resulting solution. This solution is then sprayed onto roasted coffee grounds whereby the concentration of the sclareolide based on the dry weight of coffee grounds is 0.001 ppm. When the coffee grounds are extracted and used for producing coffee beverages whether with or without cream, the resulting coffee beverages' bitterness is significantly depressed compared to coffee beverages not containing the sclareolide.

EXAMPLE XXXI

Two samples of (1) 0.04 weight percent aqueous solution of aspartame and (2) a solution obtained by adding 2.5 ppm of sclareolide to the 0.04 weight percent aqueous solution of aspartame were evaluated by the count method with trained panels of 20 using 5% aqueous solutions of sucrose as a control. The results are set forth in Table V. In the aqueous solution added with the sclareolide, it was evaluated that a sweet aftertaste and luscious taste were restrained and is rich taste was strengthened to thereby markedly improve the quality of aspartame. With the concentration of sclareolide in this experiment, no additional aesthetically displeasing taste was added. However, the mouthfeel of the resulting solutions were improved with this sclareolide.

TABLE V

|  | Solution (1) | Solution (2) | Significant Difference[2] |
|---|---|---|---|
| Aftertaste of sweetness[1] | −19 | −0.6 | ++ |
| Luscious taste of sweetness | −17 | +0.5 | ++ |
| Rich taste of sweetness | −11 | 0.4 | + |

[1]Criteria for evaluation
−[1]Very weak
−[2]Considerable weak
−[1]Somewhat weak
[0]Same as sucrose
−[1]Very strong
[2]Significant difference
++Significant difference in 1% rate
+Significant difference in 5% rate
−No significant difference.

EXAMPLE XXXII

Two samples of (1) 0.04 weight percent aqueous solution of aspartame and (2) a solution obtained by adding 1.5 ppm of sclareolide to 0.04 weight percent aqueous solution of aspartame were evaluated by the count method with trained panels of 20 using 5% aqueous solution of sucrose as a control. The results are shown in Table VI. In the aqueous solution added with the sclareolide, it was evaluated that a sweet aftertaste and luscious taste were restrained and its rich taste was strengthened thereby to markedly improve the taste quality of aspartame. With the added concentration of this no aesthetically displeasing taste of sclareolide was determined to exist. Indeed, the sclareolide improved the mouthfeel of the solutions.

TABLE VI

|  | Solution (1) | Solution (2) | Significant Difference[2] |
|---|---|---|---|
| Aftertaste of sweetness | +1.9 | +0.5 | ++ |
| Luscious taste of sweetness | +1.7 | 0.7 | ++ |
| Rich taste of sweetness | −1.1 | −0.5 | + |

As criteria for evaluation, those similar to Example XXXI (Table V) were used.

EXAMPLE XXXIII

To 200 liters of low fat milk (10% of the fat of "full-cream milk") heated to 40° C., 3 kg of 10% low fat milk powder were added with agitation. The resulting mixture was heated to 60° C. and homogenized at 150 atmospheres while adding at the rate of 0.01% sclareolide having the structure:

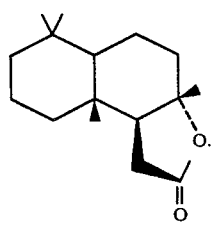

Then it was further heated to 83° C. and this temperature maintained during 5 to 6 minutes, whereafter the mixture was cooled to 48° C. and drawn off into 5 cans each having a volume of 40 liters. As soon as the temperature of the mixture was 25 to 45° C. the contents of the cans were inoculated with 2.5% by volume of an aqueous culture of bacteria such as *Lactobacillus bulgaricus*. Incubation was carried out at about 25° to 45° C. until the acidity was about 40–43 degrees Soxhlet-Henkel (about 3 hours). The cans were then stored for at least 24 hours in a cold storage room at 4° to 6° C. During this storage the biological acidulation took place and a firm structure was formed which is necessary for subsequent obtention of the final cream-like structure of the ice-cream. After storage the solidified base mixture was stirred once, whereafter the cream-like structure was obtained. To this mixture 40 kilograms of sugared pineapple fruit or other fruits were added whereafter the mixture was stirred once more. The resulting mixture was then stored in the refrigerator. The use of the sclareolide improved the iciness, mouthfeel and texture of the fat-reduced product.

EXAMPLE XXXV

One hundred parts per million of sclareolide is added to a 2% sucrose solution. The sclareolide-containing sucrose solution is compared with a plain 2% sucrose solution, and the sclareolide-containing solution is found to have a greatly enhanced sweetness. Moreover, the duration of sweetness in the enhanced sucrose solution is very appreciably greater than that of the plain sucrose solution.

EXAMPLE XXXVI

One hundred parts per million of tetramethylpyrazine and one hundred parts per million of sclareolide is added to a 2% sucrose solution. The pyrazine/sclareolide-containing sucrose solution is compared with (a) a plain 2% sucrose solution, and (b) a 2% sucrose solution containing tetramethylpyrazine only and (c) a 2% sucrose solution containing sclareolide only. The most enhanced sweetness (10 on a scale of 1 to 10) is that of the sclareolide/tetramethylpyrazine-containing solution at a level of 7 on a scale of 1 to 10 is the sclareolide-containing solution. At a level of 5 on a scale of 1 to 10 is the tetramethylpyrazine (only) containing solution.

EXAMPLE XXXVII

A solution for the evaluation of bitterness is prepared by adding 0.02 grams of nargingin in 200 ml of water. The solution is divided into two equal portions and 100 ppm of sclareolide is added to one portion. The tastes of the two portions are compared and the sclareolide-containing solution is found to reduce the bitter taste of the solution.

EXAMPLE XXXVIII

Two samples of a commercial peanut butter are admixed with sclareolide and tetramethylpyrazine so that one sample contains 10 ppm of the pyrazine and 8 ppm of sclareolide and the other sample contains 30 ppm of the pyrazine and 8 ppm of sclareolide. These samples are compared with a sample of untreated peanut butter by a trained flavor evaluation panel. The sample containing 10 ppm of the pyrazine and the sample containing 30 ppm of the pyrazine each have greatly enhanced taste and aroma. An additional sample containing 10 ppm of the pyrazine but no sclareolide is no different from the untreated sample.

EXAMPLE XXXIX

A blue cheese-type flavoring material is prepared by combining ingredients as follows:

| Ingredient | Parts |
| --- | --- |
| Caprylic acid | 129.7 |
| Acetic acid | 135.2 |
| Methyl-n-amyl ketone | 205.4 |
| Butyric acid | 237.8 |
| Caproic acid | 291.9 |
| | 1,000.0 |

The so prepared is added to 2,632,000 parts of a sour cream dip preparation to provide a blue cheese-flavored sour cream dip.

Samples of the dip are evaluated with no additive and with 12.5, 25, and 50 ppm of sclareolide added. The evaluation is carried out by a select panel of flavor evaluators.

Samples containing 12.5 and 25 ppm of sclareolide are judged to be less pungent and more blue cheese-like in odor and to posses more "body" and overall flavor quality than a control material containing no sclareolide.

What is claimed is:

1. A method for improving the bitter aftertaste of a foodstuff sweetened with a quantity of aspartame which gives rise to a bitter aftertaste in said foodstuff, comprising the step of adding to said foodstuff a debittering quantity of sclareolide having the structure:

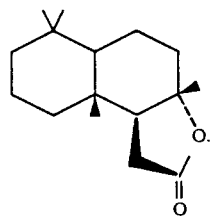

* * * * *